(12) United States Patent
Masaki et al.

(10) Patent No.: US 7,584,604 B2
(45) Date of Patent: Sep. 8, 2009

(54) EXHAUST GAS PURIFICATION APPARATUS OF ENGINE

(75) Inventors: Nobuhiko Masaki, Ageo (JP); Kiminobu Hirata, Ageo (JP); Hiroki Ueno, Ageo (JP)

(73) Assignee: Nissan Diesel Motor Co., Ltd., Ageo-shi (JP)

( * ) Notice: Subject to any disclaimer, the term of this patent is extended or adjusted under 35 U.S.C. 154(b) by 110 days.

(21) Appl. No.: 10/572,545

(22) PCT Filed: Sep. 2, 2004

(86) PCT No.: PCT/JP2004/012742

§ 371 (c)(1),
(2), (4) Date: Dec. 13, 2006

(87) PCT Pub. No.: WO2005/028825

PCT Pub. Date: Mar. 31, 2005

(65) Prior Publication Data

US 2007/0101700 A1 May 10, 2007

(30) Foreign Application Priority Data

Sep. 19, 2003 (JP) ............................. 2003-327294

(51) Int. Cl.
*F01N 3/00* (2006.01)
(52) U.S. Cl. .............................. 60/286; 60/295; 60/324; 239/437; 239/533.12
(58) Field of Classification Search .................. 60/286, 60/295, 301, 303, 324; 239/432, 433, 438, 239/439, 437, 533.12
See application file for complete search history.

(56) References Cited

U.S. PATENT DOCUMENTS

| 5,176,325 | A | * | 1/1993 | Vidusek | 239/419.3 |
| 5,372,312 | A | * | 12/1994 | Vidusek | 239/419.3 |
| 5,553,783 | A | * | 9/1996 | Slavas et al. | 239/403 |

(Continued)

FOREIGN PATENT DOCUMENTS

DE 19855338 6/2000

(Continued)

*Primary Examiner*—Tu M Nguyen
(74) *Attorney, Agent, or Firm*—McDermott Will & Emery LLP (57) ABSTRACT

For preventing clogging in an injection nozzle for supplying a reducing agent to exhaust gas flow on an upstream side of a reducing catalyst and for improving the efficiency of NOx purification processing, the injection nozzle 14 has a tip end portion 18 provided with a ring shaped protruding ridge 19 disposed on an outer peripheral surface of an exhaust gas downstream side end portion of the tip end portion 18 that is arranged substantially in parallel with an exhaust gas flow direction A inside an exhaust pipe 13, the ring shaped protruding ridge 19 being provided with injection hole or holes 20 drilled outward from the central axis of the injection nozzle 14, so that the reducing agent is ejected on the exhaust gas upstream side of the reduction catalyst, from the injection holes 20. The injection holes 20 do not directly open on a wide outer peripheral surface of the injection nozzle 14, and then when injection stops, the reducing agent does not become attached to or does not remain around the injection holes 20, or the remaining amount thereof becomes small, so that clogging of the injection holes 20 of the injection nozzle 14 is prevented, and the efficiency of NOx purification processing is improved.

2 Claims, 6 Drawing Sheets

U.S. PATENT DOCUMENTS

| | | | |
|---|---|---|---|
| 5,603,453 A | | 2/1997 | Weaver et al. |
| 5,606,856 A | | 3/1997 | Linder et al. |
| 5,904,299 A | * | 5/1999 | Hans et al. .................. 239/408 |
| 5,992,141 A | * | 11/1999 | Berriman et al. .............. 60/274 |
| 6,041,594 A | | 3/2000 | Brenner et al. |
| 6,098,896 A | * | 8/2000 | Haruch ......................... 239/8 |
| 6,227,457 B1 | * | 5/2001 | Oliver .......................... 239/5 |
| 6,382,600 B1 | | 5/2002 | Mahr |
| 6,845,925 B2 | * | 1/2005 | Abe et al. .............. 239/533.12 |
| 7,121,480 B2 | * | 10/2006 | Pontoppidan .......... 239/533.12 |

FOREIGN PATENT DOCUMENTS

| | | |
|---|---|---|
| DE | 19946901 | 4/2001 |
| DE | 10060808 | 7/2002 |
| EP | 0886043 | 12/1998 |
| JP | 08-210124 | 8/1996 |
| JP | 09-509890 | 10/1997 |
| JP | 2000-027627 | 1/2000 |
| JP | 2001-173431 | 6/2001 |
| JP | 2002-531743 | 9/2002 |

* cited by examiner

EXHAUST GAS PURIFICATION APPARATUS OF ENGINE

This application is a continuation of PCT/JP2004/012742, filed on Sep. 2, 2004.

BACKGROUND OF THE INVENTION

1. Field of the Invention

The present invention relates to an exhaust gas purification apparatus that uses a reducing agent to remove by reduction nitrogen oxide (NOx) discharged from an engine such as a diesel engine, a gasoline engine, or the like, mounted on a mobile vehicle. In particular, it relates to an engine exhaust gas purification apparatus that prevents clogging of an injection nozzle for supplying by injection a reducing agent to an exhaust gas flow at an upstream side of a reducing catalyst, to improve the efficiency of NOx purification processing.

2. Description of the Related Art

As a system which purifies exhaust gas by removing particularly NOx from among particulate matters (PM) in exhaust gas discharged from an engine, several exhaust gas purification apparatus have been proposed. In these exhaust gas purification apparatus, a reduction catalyst is placed in the exhaust system of the engine, and a reducing agent is injection-supplied into an exhaust gas passage on the upstream side of the reduction catalyst, to thereby catalytically reduction react the NOx in the exhaust gas with the reducing agent, and thus purification process is applied to convert the NOx into harmless constituents. The reducing agent is stored in a liquid state at room temperature in a reservoir tank, and a necessary amount thereof is injection-supplied from an injection nozzle. The reduction reaction uses ammonia which has excellent reactivity with NOx, and an aqueous solution of reducing agent such as a urea aqueous solution, ammonia aqueous solution or the like that is hydrolyzed to produce ammonia easily is used as the reducing agent (refer for example to Japanese Unexamined Patent Publication No. 2000-27627 and Japanese Unexamined Patent Publication No. 2001-173431).

Figure 6:
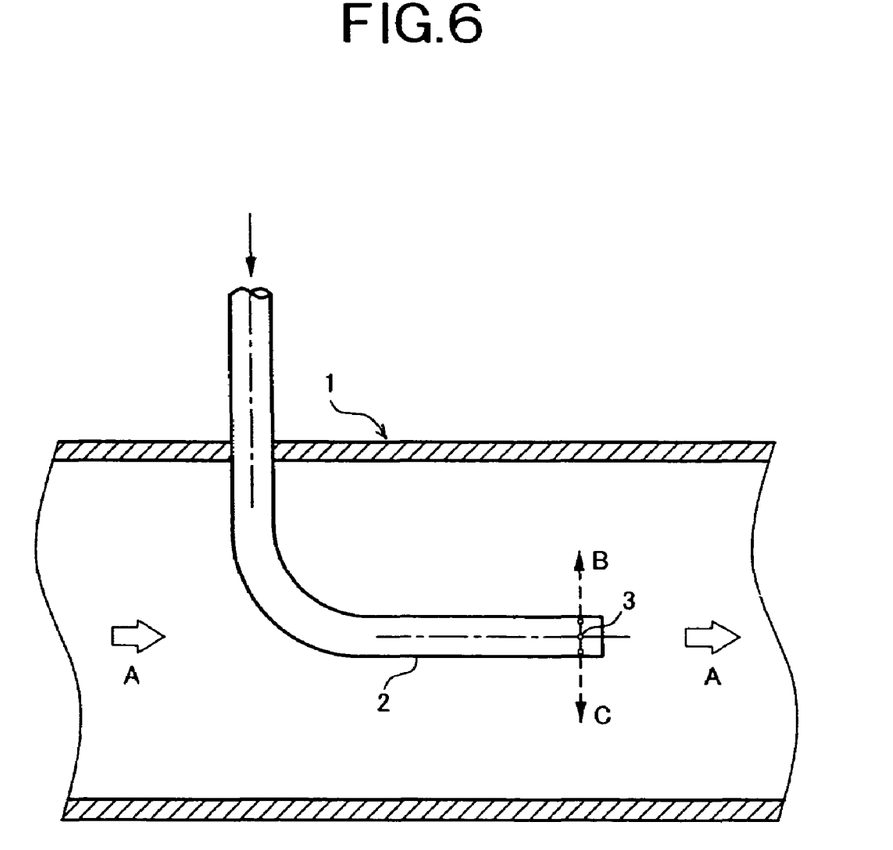
FIG. 6 is an explanatory diagrammatic view illustrating an injection nozzle applicable to a conventional exhaust gas purification apparatus.

In such an exhaust gas purification apparatus, as shown in FIG. 6, an injection nozzle 2 is arranged substantially parallel with a direction A of the exhaust gas flow inside an exhaust pipe 1 of an exhaust system so as to face the downstream side, and a reducing agent such as a urea aqueous solution is ejected from the injection nozzle 2 substantially orthogonal with respect to the exhaust gas flow direction A as indicated by arrows B and C. Moreover, as shown in FIG. 7, in the vicinity of an end portion of the injection nozzle 2 on the exhaust gas downstream side, injection holes 3 are drilled outward from the central axis and substantially orthogonal thereto, inside a thick portion of a nozzle main body.

Figure 7:
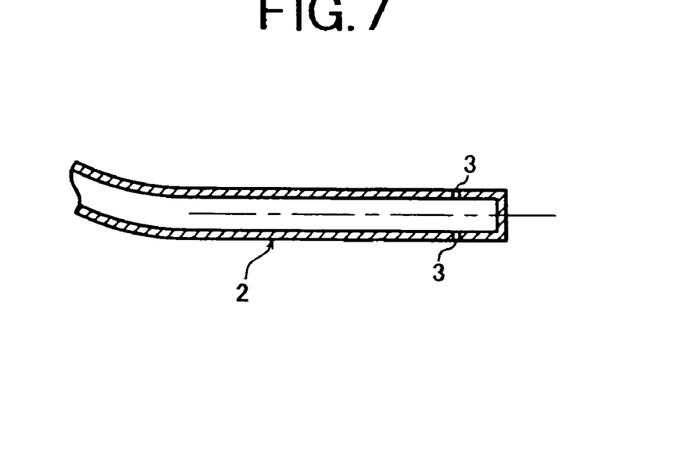
FIG. 7 is an enlarged sectional view illustrating injection holes drilled in a nozzle main body tip end portion of the conventional injection nozzle.
Figure 8A:
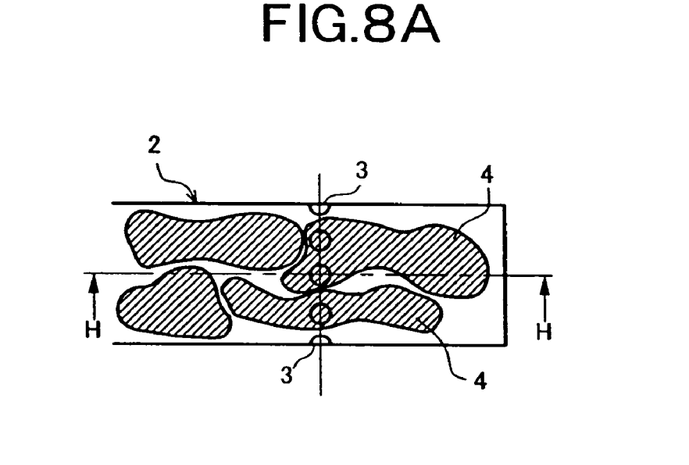
FIG. 8A is a plan view showing a state in which a urea aqueous solution is attached to and remains on an outer peripheral surface of the nozzle main body tip end portion.
Figure 8B:
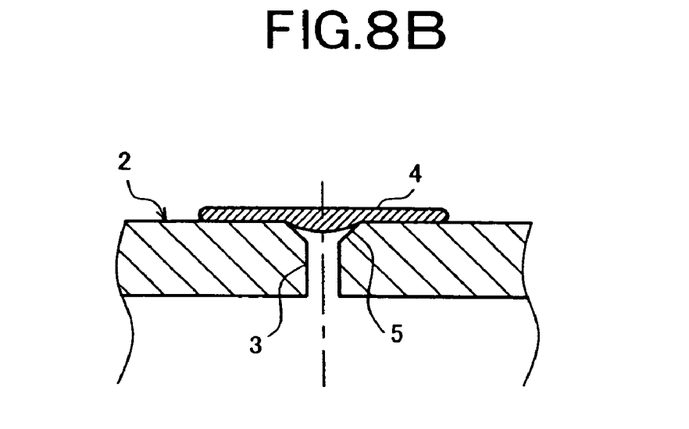
FIG. 8B is an enlarged sectional view of FIG. 8A taken along a line H-H.

However in the aforementioned conventional exhaust gas purification apparatus, since as shown in FIG. 7, the injection holes 3 of the injection nozzle 2 are drilled inside the thick portion of the nozzle main body, and the injection holes 3 open directly to the outer peripheral surface of the nozzle main body, when injection of the urea aqueous solution from the injection nozzle 2 stops, then as shown in FIG. 8A, in some cases a urea aqueous solution 4 becomes attached to the injection holes 3 and remains in the vicinity thereof, on the outer peripheral surface of the nozzle main body. Moreover, as shown in FIG. 8B, since chamfers 5 tilted inward are formed on the inner peripheral edge where the injection holes 3 open on the outer peripheral surface of the nozzle main body, it is possible that the urea aqueous solution 4 remaining on the outer peripheral surface of the nozzle main body enters into the injection holes 3 along the inclination of the chamfers 5, and dries out and solidifies inside the injection holes 3. In such cases, the injection holes 3 of the nozzle 2 become clogged so that sufficient reducing agent cannot be supplied into the exhaust gas passage on the upstream side of the reduction catalyst, which results in a decrease in the efficiency of purification processing of the NOx into harmless constituents.

Furthermore, since as shown in FIG. 7, the injection holes 3 are provided by drilling, so that these holes 3 are directed outward from the central axis of the nozzle main body and substantially orthogonal thereto, and so that the urea aqueous solution is ejected from the injection nozzle 2 in the directions indicated by the arrows B and C (see FIG. 6) substantially orthogonal to the exhaust gas flow direction A. As a result, the urea aqueous solution is unlikely to follow the exhaust gas flow. Particularly where the exhaust gas amount is small, it is possible that the urea aqueous solution 4 ejected from the injection holes 3 in FIG. 6, becomes attached to the internal surface of the exhaust pipe 1 and urea is deposited, and the urea aqueous solution 4 decreases by the amount of urea deposited, so that the mixing proportion of the urea aqueous solution 4 and the exhaust gas decreases, resulting in a decrease in the efficiency of the NOx purification processing in some cases.

SUMMARY OF THE INVENTION

Therefore, the present invention addresses such problems, with an object of providing an engine exhaust gas purification apparatus in which clogging in an injection nozzle, which supplies a reducing agent to an exhaust gas flow on an upstream side of a reduction catalyst is prevented, and the mixing proportion of the reducing agent and the exhaust gas is improved, and the efficiency of NOx purification processing is improved.

In accordance with a first aspect of the invention, there is provided an exhaust gas purification apparatus of an engine which comprises a reduction catalyst, which is arranged in an exhaust system of an engine, for reducing and purifying nitrogen oxide in an exhaust gas using a reducing agent; and a reducing agent supply device having a tip end portion of an injection nozzle which extends towards a downstream side in an exhaust gas passage of the exhaust system, substantially in parallel with an exhaust gas flow direction, for supplying the reducing agent to an exhaust gas flow on an upstream side of the reduction catalyst; wherein on an exhaust gas downstream side end portion of a tip end portion of the injection nozzle, an exhaust gas downstream side end surface is blocked, and a ring shaped protruding ridge is provided on an outer peripheral surface, and an injection hole is provided in the protruding ridge portion for injecting the reducing agent in an outward direction from an axial center of the injection nozzle.

According to such a construction, the end face of the exhaust gas downstream side end portion of the tip end portion of the injection nozzle extending substantially in parallel with the exhaust gas flow direction towards the downstream side in the exhaust gas passage of the exhaust system is blocked, and the injection hole provided in the ring shaped protruding ridge portion provided on the outer peripheral surface thereof, ejects the reducing agent in an outward direction from an axial center of the injection nozzle. As a result, the reducing agent is ejected on the exhaust gas upstream side of the reduction catalyst.

In accordance with a second aspect of the invention, there is provided a plurality of the injection holes, which are drilled in a radial pattern in an outward direction from the axial center of the tip end portion of the injection nozzle. As a result, the injection holes substantially evenly eject the reducing agent into all regions inside the exhaust gas passage of the exhaust system.

In accordance with a third aspect of the invention, the afore-mentioned injection hole is drilled diagonally in a direction tilted towards the downstream side with respect to the exhaust gas flow direction. As a result, the injection hole ejects the reducing agent in a diagonal direction on the downstream side.

In accordance with a fourth aspect of the invention, the afore-mentioned ring shaped protruding ridge is formed in a shape that is tapered towards an outer peripheral surface. As a result, a flat surface portion in the vicinity of the injection hole provided on the ring shaped protruding ridge portion is narrowed, so that when ejection from the injection nozzle stops, the reducing agent does not become attached to or deposited on the narrow region around the injection hole or holes and does not remain there, or the amount of the remaining reducing agent becomes smaller.

According to the configuration of the first aspect of the invention, a reducing agent can be ejected in an outward direction from the axial center of an injection nozzle, from injection holes provided in a ring shaped protruding ridge portion provided on the outer peripheral surface of the exhaust gas downstream side end portion of the tip end portion of the injection nozzle, and the reducing agent can be ejected on the exhaust gas upstream side of the reduction catalyst. In this case, since the injection holes are formed in the ring shaped protruding ridge portion provided on the outer peripheral surface of the tip end portion of the injection nozzle, and do not directly open on a wide outer peripheral surface of the injection nozzle, then when injection stops the reducing agent does not become attached to or does not remain in the narrow region around the injection holes, or even if it becomes attached, the amount is small corresponding to the narrow region. Consequently, the reducing agent does not enter into the injection holes of the injection nozzle, so that clogging can be prevented. Therefore, the efficiency of NOx purification processing can be improved.

Furthermore, according to the configuration of the second aspect of the invention, the reducing agent can be substantially evenly ejected into all regions inside the exhaust gas passage of the exhaust system, from the plurality of injection holes drilled in the tip end portion of the injection nozzle in a radial pattern directed outward from the axial center. Consequently, a mixing proportion of the reducing agent and the exhaust gas can be improved. Therefore, the efficiency of NOx purification processing can be improved.

Furthermore, according to the configuration of the third aspect of the invention, the reducing agent can be ejected in a diagonal direction on the downstream side, from the injection holes drilled inclined in a diagonal direction towards the downstream side with respect to the exhaust gas flow direction. At this time, the reducing agent ejected in a diagonal direction flows along the exhaust gas flow, preventing the reducing agent from becoming attached to the internal surface of the exhaust gas passage, and even in the case where the amount of exhaust gas is small, the reducing agent and exhaust gas are brought in good contact, and the mixing proportion thereof can be improved. Therefore, the efficiency of NOx purification processing can be improved.

Moreover, according to the configuration of the fourth aspect of the invention, due to the ring shaped protruding ridge formed in a shape that is tapered towards the outer peripheral surface, the flat surface portion in the vicinity of the injection holes are narrowed, and the reducing agent does not become attached to or does not remain in the narrowed region around the injection holes when injection from the injection nozzle stops, or the remaining amount thereof becomes small. Accordingly, clogging in the injection holes of the injection nozzle can be better prevented. Therefore, the efficiency of NOx purification processing can be improved.

BRIEF DESCRIPTION OF THE DRAWINGS

FIGS. 3A through 3C are enlarged explanatory diagrammatic views illustrating a nozzle tip end portion of an injection nozzle, respectively, in which

FIGS. 5A through 5C are enlarged explanatory diagrammatic views illustrating a nozzle tip end portion of an injection nozzle, respectively, in which

FIGS. 8A and 8B are enlarged explanatory diagrammatic views illustrating the nozzle main body tip end portion of a conventional injection nozzle, respectively, in which

DESCRIPTION OF THE PREFERRED EMBODIMENTS

Figure 1:
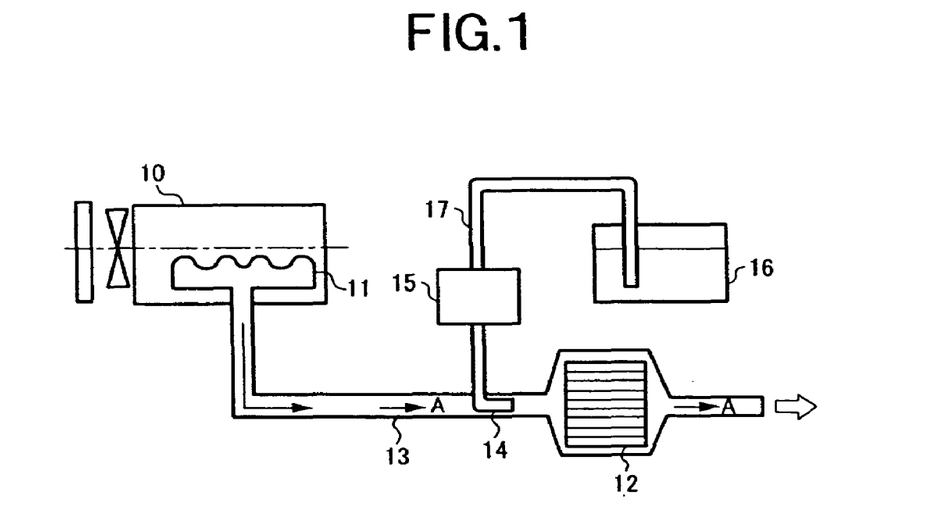
FIG. 1 is a conceptual diagrammatic view illustrating an embodiment of an engine exhaust gas purification apparatus according to the present invention.

Hereunder is a detailed description of an embodiment of the present invention, based on the appended drawings. FIG. 1 is a conceptual diagrammatic view that shows an embodiment of an engine exhaust gas purification apparatus according to the present invention. This exhaust gas purification apparatus uses a reducing agent to reduce and remove NOx discharged from a diesel engine, a gasoline engine, or the like, mounted on a mobile vehicle. Exhaust gas of an engine 10, which uses gasoline or diesel oil as a fuel, is discharged from an exhaust gas manifold 11 into the atmosphere via an exhaust pipe 13 in which a NOx reduction catalyst 12 is arranged. More specifically, the exhaust system is of a construction in which three catalysts, namely a nitrogen monoxide (NO) oxidation catalyst, a NOx reduction catalyst, and an ammonia slip oxidation catalyst, are arranged in this order from the exhaust gas upstream side, in the exhaust pipe 13 serving as an exhaust gas passage, and a temperature sensor, an oxygen sensor, and so forth, are arranged before and after the catalysts. However, the detailed construction of the exhaust system is not shown in the diagram.

The NOx reduction catalyst 12 is for reducing and purifying NOx in the exhaust gas passing through the exhaust pipe 13, using a reducing agent, and has for example a zeolite type active ingredient supported on a monolithic type catalyst carrier having a honeycomb shaped cross-section made from either a ceramic cordilite, or an Fe-Cr-Al system heat-resistant steel. Moreover, the active ingredient supported on the catalyst carrier receives a supply of a reducing agent and is activated and effectively purifies the NOx into a harmless substance.

An injection nozzle 14 is provided on the inside of the exhaust pipe 13 on the upstream side of the NOx reduction catalyst 12, and a reducing agent together with pressurized air are injection-supplied from a reducing agent supply device 15 through the injection nozzle 14. Here, the injection nozzle 14 is arranged substantially in parallel with an exhaust gas flow direction A inside the exhaust pipe 13, facing the downstream side. Moreover, the reducing agent which is stored in a reservoir tank 16, is supplied to the reducing agent supply device 15 through a supply pipe 17. Thus, the injection nozzle 14 and the reducing agent supply device 15 constitute a reducing agent supplier or supply system that supplies the reducing agent to the exhaust gas flow on an upstream side of the NOx reduction catalyst 12.

In this embodiment, a urea aqueous solution is used as the reducing agent to be injection-supplied by the injection nozzle 14. Alternatively, an ammonia aqueous solution may be used. Moreover, the urea aqueous solution injection-supplied by the injection nozzle 14 is hydrolyzed by the exhaust heat inside the exhaust pipe 13 and readily generates ammonia. The obtained ammonia reacts with NOx in the exhaust gas in the NOx reduction catalyst 12, and purifies the NOx into aqueous and harmless gas. The urea aqueous solution is an aqueous solution of a solid or flour state urea, and is stored in the reservoir tank 16. It is supplied to the reducing agent supply device 15 through the supply pipe 17.

Figure 2:
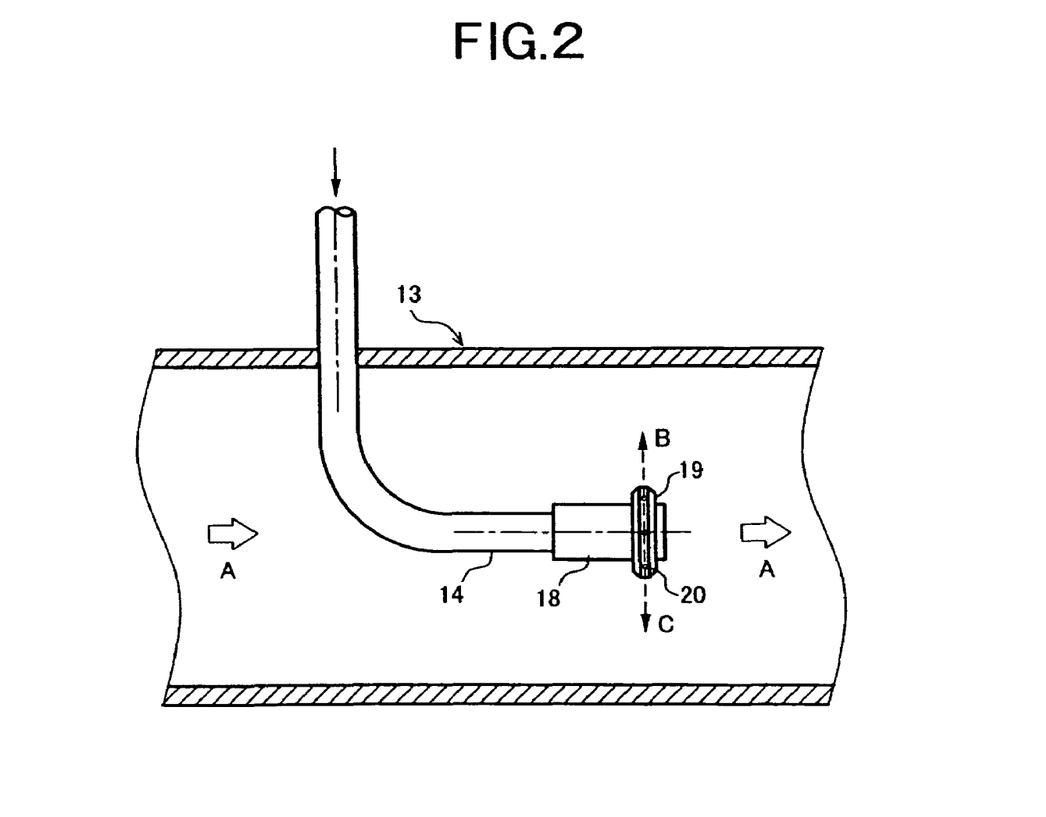
FIG. 2 is an explanatory diagrammatic view illustrating an injection nozzle applicable to the exhaust gas purification apparatus of the present invention.
Figure 3A:
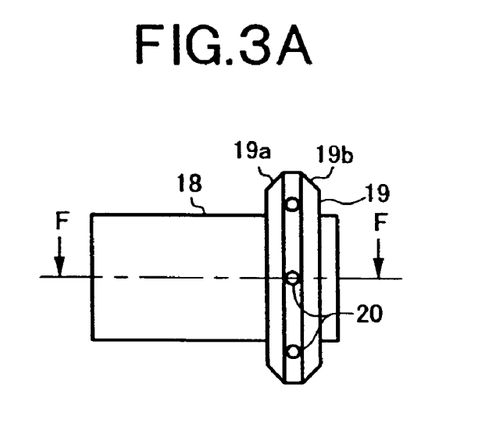
FIG. 3A is a front view.
Figure 3B:
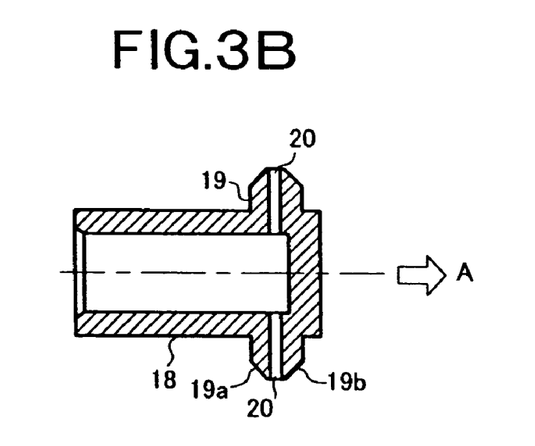
FIG. 3B is a sectional view taken along a line F-F.
Figure 3C:
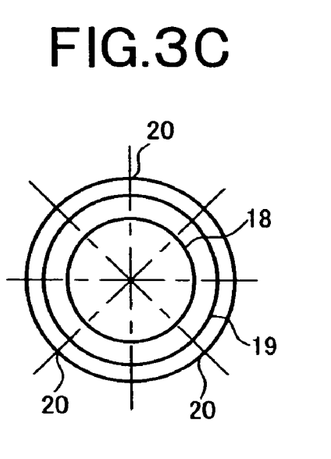
FIG. 3C is a right side view of FIG. 3A.

Here in the present invention, as shown in FIG. 2, the injection nozzle 14 has a nozzle tip end portion 18 extending substantially in parallel with the exhaust gas flow direction A towards the downstream side, and this nozzle tip end portion 18 is constructed as best shown in FIGS. 3A through 3C. That is to say, in FIGS. 3A through 3C, on the nozzle tip end portion 18 as shown in FIG. 3A, a ring shaped protruding ridge 19 is provided on an outer peripheral surface of an exhaust gas downstream side end portion (right side end portion in the diagram), and as shown in FIG. 3B, injection holes 20 which eject a urea aqueous solution in an outward direction from the axial center of the injection nozzle 14, are provided in the protruding ridge portion 19. In this embodiment, the injection holes 20 having diameters approximately 0.5 mm for example, are drilled outwards from the axial center of the injection nozzle 14 and substantially orthogonal thereto. In the nozzle tip end portion 18, an exhaust gas downstream side end surface is blocked.

Furthermore, as shown in FIG. 3C, the injection holes 20 are drilled in a plurality of positions in a radial pattern facing outwards from the axial center of the nozzle tip end portion 18. For example, eight holes are drilled radially in positions which divide the ring shaped protruding ridge portion 19 into eight equal parts around the circumferential direction. Such a nozzle tip end portion 18 allows the urea aqueous solution to be substantially evenly ejected into all regions inside the exhaust pipe 13. The number of the injection holes 20 is not limited to eight, and may be an appropriate number according to the specification.

Moreover, as shown in FIGS. 3A and 3B, the ring shaped protruding ridge 19 is formed in a shape tapered towards the outer peripheral surface. That is to say, inclined chamfers 19a and 19b are formed on the outer peripheral surface of the protruding ridge 19 around the circumferential direction on the corner portions on the upstream side and downstream side of the exhaust gas flow direction A. As a result, the flat surface portion in the vicinity of the injection holes 20 is made narrow, so that when ejection from the injection nozzle 14 stops, the urea aqueous solution does not become attached to the narrow region around the injection holes 20 and does not remain there, or the remaining amount thereof can be small. The tapered shape of the ring shaped protruding ridge 19 is not limited to having the chamfers 19a and 19b, and the corners on the upstream side and downstream side of the exhaust gas flow direction A may be formed as substantially quarter arc curved surfaces, respectively. Moreover, the nozzle tip end portion 18 is attached to the nozzle main body shown in FIG. 2 by an insertion fit, such as a snag fit or tight fit, by screwing in, or by welding.

Next is a description of the operation of the exhaust gas purification apparatus constructed in this manner. First in FIG. 1, the exhaust gas produced by and emitted from the engine 10 during the operation thereof travels from the exhaust gas manifold 11 through the exhaust pipe 13, and then passes through the NOx reduction catalyst 12 arranged part way along inside of the exhaust pipe 13, and is discharged into the atmosphere from an end portion outlet of the exhaust pipe 13. At this time, a urea aqueous solution is injected inside the exhaust pipe 13 from the injection nozzle 14 arranged on the exhaust gas upstream side of the NOx reduction catalyst 12. The urea aqueous solution is supplied from the urea aqueous solution reservoir tank 16 to the reducing agent supply device 15 through the supply pipe 17, and by the operation of the reducing agent supply device 15, pressurized air together with the urea aqueous solution is supplied to the injection nozzle 14.

The urea aqueous solution and the pressurized air supplied to the injection nozzle 14 by the reducing agent supply device 15 reach the nozzle tip end portion 18 as shown in FIG. 2, and since as shown in FIG. 3B, the exhaust gas downstream side end surface of the nozzle tip end portion 18 is blocked, they are injection-supplied from the injection holes 20 drilled in a radial pattern as shown in FIG. 3C, to the periphery thereof in a direction substantially orthogonal to the exhaust gas flow direction A as indicated by arrows B and C in FIG. 2. At this time, the urea aqueous solution that has been injection-supplied by the injection nozzle 14 is substantially evenly injected into all regions inside the exhaust pipe 13, and is well mixed with the exhaust gas, and it is hydrolyzed by the exhaust heat inside the exhaust pipe 13 and readily produces ammonia. The obtained ammonia reacts with NOx in the exhaust gas in the NOx reduction catalyst 12, and purifies the NOx into aqueous and harmless gas.

Next, in order to stop the injection of the urea aqueous solution from the injection nozzle 14 when the engine 10 stops, the reducing agent supply device 15 is operated to at first shut off the urea aqueous solution supply from the reservoir tank 16, and to then only supply pressurized air to the injection nozzle 14 for a while. As a result, the urea aqueous solution is pushed out from the nozzle main body of the injection nozzle 14, the nozzle tip end portion 18, and the injection holes 20, and injection of the urea aqueous solution stops. At this time, the injection holes 20 are formed on the ring shaped protruding ridge portion 19 provided on the outer peripheral surface of the injection nozzle 14, and they do not directly open on a wide peripheral surface of the injection nozzle 14. Furthermore, the flat surface portion in the vicinity of the injection holes 20 is made narrow, so that when injection stops, the urea aqueous solution does not become attached to the narrow region around the injection holes 20 and does not remain there, or the remaining amount thereof becomes small. As a result, clogging in the injection holes 20 of the injection nozzle 14 can be prevented. Consequently, the efficiency of NOx purification processing can be improved.

Figure 4:
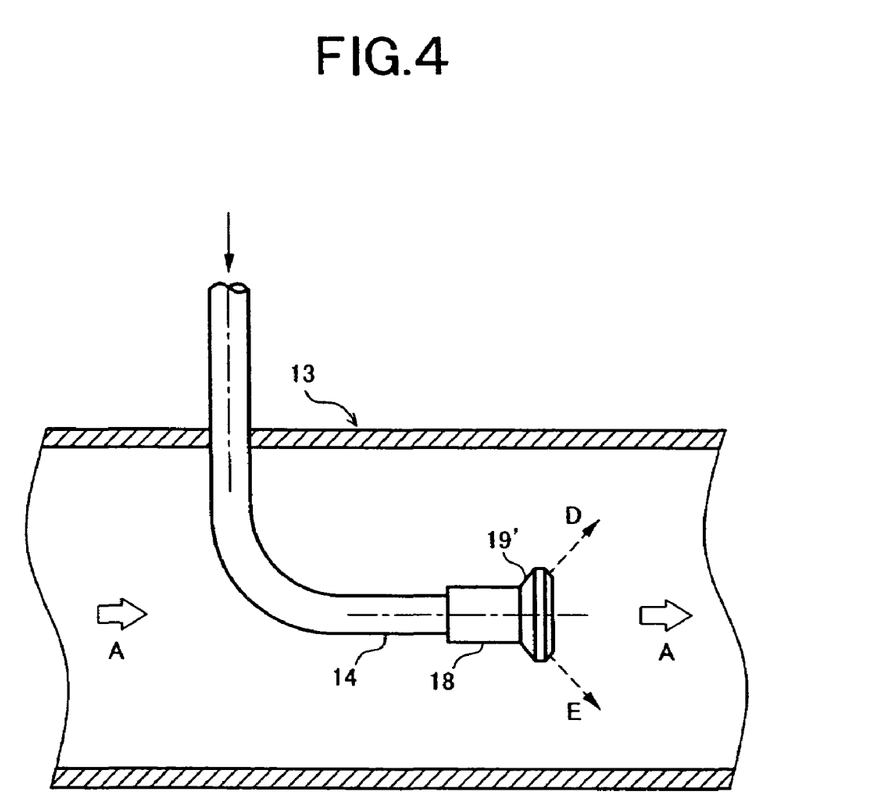
FIG. 4 is an explanatory diagrammatic view illustrating another embodiment of an injection nozzle applicable to the exhaust gas purification apparatus according to the present invention.
Figure 5A:
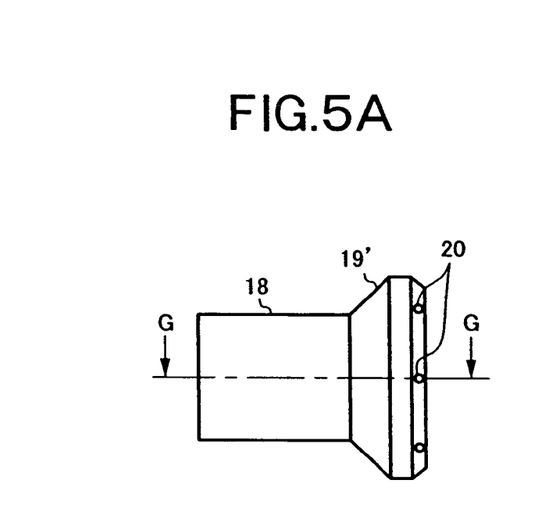
FIG. 5A is a front view.
Figure 5B:
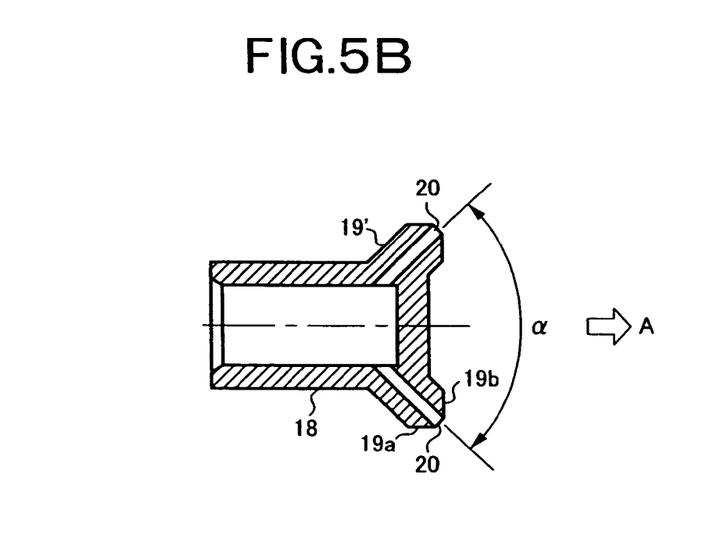
FIG. 5B is a sectional view taken along a line G-G.
Figure 5C:
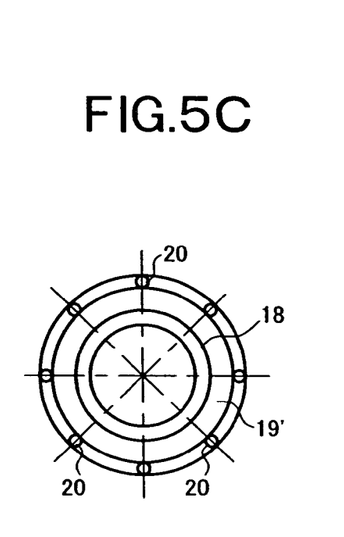
FIG. 5C is a right side view of FIG. 5A.

FIG. 4 is an explanatory diagram showing another embodiment of the injection nozzle 14 applicable to the exhaust gas purification apparatus of the present invention. In this embodiment, the injection holes 20 of the injection nozzle 14 are drilled diagonally in a direction tilted towards the downstream side with respect to the exhaust gas flow direction A. That is to say, in the nozzle tip end portion 18 shown in FIGS. 5A through 5C, as shown in the FIG. 5A a ring shaped protruding ridge 19' is provided on the outer peripheral surface of the exhaust gas downstream side end portion (right side end portion in the diagram) of the injection nozzle 14, and as shown in FIG. 5B the protruding ridge portion 19' is provided in a tilted state with an appropriate angle in a diagonal direction on the downstream side with respect to the exhaust gas flow direction A, and the injection holes 20 are provided inside the protruding ridge portion 19' directed outwards from the axial center tilted at the same angle as the tilt angle of the protruding ridge portion 19'. In this embodiment, as shown in FIG. 5B, the tilt angle of the injection holes 20 is for example 45° with respect to the central axis, and as shown in FIG. 5C, an injection angle a between the two diametrally opposing injection holes 20 drilled in a plurality of positions in a radial pattern is 90° for example. Construction other than this is the same as for the embodiment shown in FIGS. 3A through 3C.

In this case, as shown in FIG. 4, the urea aqueous solution is ejected from the injection holes 20 drilled as described above, in diagonal directions indicated by arrows D and E towards the downstream side with respect to the exhaust gas flow direction A. As a result, the urea aqueous solution ejected in a diagonal direction flows along the exhaust gas flow, preventing the urea aqueous solution from becoming attached to the internal surface of the exhaust gas passage 13, and even in the case where the amount of exhaust gas is small, the urea aqueous solution and the exhaust gas come in good contact, so that the mixing proportion thereof can be improved.

Furthermore, in the embodiment shown in FIG. 4 and FIGS. 5A through 5C, another kind of nozzle tip end portion 18 in which the tilt angle of the injection holes 20 is changed, may be attached to the nozzle main body. For example, a nozzle tip end portion 18 in which the tilt angle of the injection holes 20 is 60° with respect to the central axis, and as shown in FIG. 5C, the injection angle a between the two diametrically opposing injection holes 20 drilled in a plurality of positions in a radial pattern is for example 120°, may be attached. This injection angle a may be an optional angle that prevents the urea aqueous solution injected from the injection nozzle 14 from contacting with a diffuser panel provided immediately before the NOx reducing catalyst 12 shown in FIG. 1. As a result, the direction of the urea aqueous solution ejected from the injection holes 20 in diagonal directions indicated by arrows D and E with respect to the exhaust gas flow direction A, can be appropriately changed and set in accordance with the specifications of the exhaust system of the engine. Consequently, a mix proportion of the urea aqueous solution and the exhaust gas can be adjusted.

In the embodiment shown in FIG. 2 and FIG. 4, the nozzle tip end portion 18 of the injection nozzle 14 may be integrally formed with the nozzle main body.

What we claim is:

1. An exhaust gas purification apparatus of an engine comprising:
    a reduction catalyst that is arranged in an exhaust system of the engine, for reducing and purifying nitrogen oxide in an exhaust gas using a reducing agent; and
    a reducing agent supplier provided with an injection nozzle having a tip end portion, which extends towards a downstream side in an exhaust gas passage of said exhaust system, substantially parallel with an exhaust gas flow direction, for supplying said reducing agent to an exhaust gas on an upstream side of said reduction catalyst;
    wherein an exhaust gas downstream side end portion of the tip end portion of said injection nozzle has an exhaust gas downstream side end surface that is blocked, and a ring shaped protruding ridge is provided on an outer peripheral surface of the exhaust gas downstream side end portion and is formed to be a convexly protruded portion having a width and extended from the outer peripheral surface of the exhaust gas downstream end portion in an outward direction substantially orthogonal to a central axis of said injection nozzle, wherein said ring shaped protruding ridge is further formed in a tapered shape by forming inclined chamfers on corner portions on the upstream side and the downstream side of the exhaust gas flow direction on an outer peripheral surface of an outer end portion of said ring shaped protruding ridge with at least one injection hole in the outer peripheral surface for ejecting said reducing agent in the outward direction substantially orthogonal to the central axis of said injection nozzle.

2. The exhaust gas purification apparatus according to claim 1, wherein said ring shaped protruding ridge is formed with a plurality of said injection holes that are drilled in a radial pattern in the outward direction from the central axis of the tip end portion of said injection nozzle.

* * * * *